US010336339B2

(12) United States Patent
Göppert

(10) Patent No.: US 10,336,339 B2
(45) Date of Patent: Jul. 2, 2019

(54) METHOD FOR CONTROLLING A POWERTRAIN

(71) Applicant: Schaeffler Technologies AG & Co. KG, Herzogenaurach (DE)

(72) Inventor: Georg Göppert, Hausach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/551,816

(22) PCT Filed: Feb. 4, 2016

(86) PCT No.: PCT/DE2016/200071
§ 371 (c)(1),
(2) Date: Aug. 17, 2017

(87) PCT Pub. No.: WO2016/134711
PCT Pub. Date: Sep. 1, 2016

(65) Prior Publication Data
US 2018/0029601 A1    Feb. 1, 2018

(30) Foreign Application Priority Data

Feb. 25, 2015  (DE) .................. 10 2015 203 373
May 5, 2015    (DE) .................. 10 2015 208 233

(51) Int. Cl.
B60W 10/06      (2006.01)
B60W 30/20      (2006.01)
(Continued)

(52) U.S. Cl.
CPC .......... B60W 30/20 (2013.01); B60W 10/02 (2013.01); B60W 10/06 (2013.01); F16D 21/06 (2013.01);
(Continued)

(58) Field of Classification Search
CPC ............... Y10T 477/75; Y10T 477/753; Y10T 477/755; B60W 30/20; B60W 10/02;
(Continued)

(56) References Cited

U.S. PATENT DOCUMENTS 9,206,898 B2 * 12/2015 Mordukhovich ....... F16H 61/12
9,371,066 B2 *  6/2016 Pietron .................. B60W 10/02
(Continued)

FOREIGN PATENT DOCUMENTS

DE    102005036894 A1   3/2006
DE    112012001191 T5   12/2013
(Continued)

OTHER PUBLICATIONS

English translation of DE102014212153A; http://translationportal.epo.org; Nov. 28, 2018 (Year: 2018).*
(Continued)

Primary Examiner — Roger L Pang
(74) Attorney, Agent, or Firm — Reid A. Baldwin

(57) ABSTRACT

A system and method for controlling a powertrain, comprising an internal combustion engine connected to a double clutch transmission having a first and a second partial transmission with at least one shiftable transmission stage. A first friction clutch is arranged between the internal combustion engine and the first partial transmission, and a second friction clutch is arranged between the internal combustion engine and the second partial transmission. An engine torque of the internal combustion engine is transmitted by the first and second friction clutches to the first or second partial transmissions to provide a drivetrain torque at the output of the double clutch transmission. The powertrain is monitored for an occurrence of juddering oscillations, wherein in response to juddering oscillations being detected a regeneration process of one of the first and second friction (Continued)

clutches is triggered, and a friction lining is removed in the regeneration process.

17 Claims, 1 Drawing Sheet

(51) Int. Cl.
| | |
|---|---|
| *F16D 48/06* | (2006.01) |
| *F16H 57/00* | (2012.01) |
| *B60W 10/02* | (2006.01) |
| *F16D 21/06* | (2006.01) |
| *B60W 10/113* | (2012.01) |
| *F16H 3/00* | (2006.01) |

(52) U.S. Cl.
CPC ......... *F16D 48/06* (2013.01); *F16H 57/0006* (2013.01); *B60W 10/113* (2013.01); *B60W 2510/0241* (2013.01); *B60W 2550/12* (2013.01); *B60W 2710/021* (2013.01); *B60W 2710/025* (2013.01); *B60W 2710/027* (2013.01); *B60W 2710/0666* (2013.01); *F16D 2021/063* (2013.01); *F16D 2500/1045* (2013.01); *F16D 2500/10412* (2013.01); *F16D 2500/30406* (2013.01); *F16D 2500/3122* (2013.01); *F16D 2500/50293* (2013.01); *F16D 2500/7044* (2013.01); *F16D 2500/70426* (2013.01); *F16H 3/006* (2013.01); *Y10T 477/75* (2015.01); *Y10T 477/753* (2015.01); *Y10T 477/755* (2015.01)

(58) Field of Classification Search
CPC ... B60W 2710/021; B60W 2510/0241; B60W 2710/025; B60W 2550/12; B60W 2710/027; B60W 10/113; F16D 21/06; F16D 2500/30406; F16D 2500/70426; F16D 2500/50293; F16D 2500/3122; F16D 2500/1045; F16D 2500/10412; F16H 3/006
See application file for complete search history.

(56) References Cited

U.S. PATENT DOCUMENTS

| | | | |
|---|---|---|---|
| 9,624,991 B2* | 4/2017 | Neuberth | ............... F16D 48/06 |
| 2010/0185373 A1* | 7/2010 | Herter | .................. B60W 30/20 |
| | | | 701/67 |

FOREIGN PATENT DOCUMENTS

| | | |
|---|---|---|
| DE | 102012223765 A1 | 6/2014 |
| DE | 102014212153 A1 | 1/2015 |
| WO | 2007124710 A1 | 11/2007 |

OTHER PUBLICATIONS

English translation of DE102012223765A; http://translationportal.epo.org; Nov. 28, 2018 (Year: 2018).*
International Search Report for PCT/DE2016/200071; 2 pgs; dated May 11, 2016 by European Patent Office.

* cited by examiner

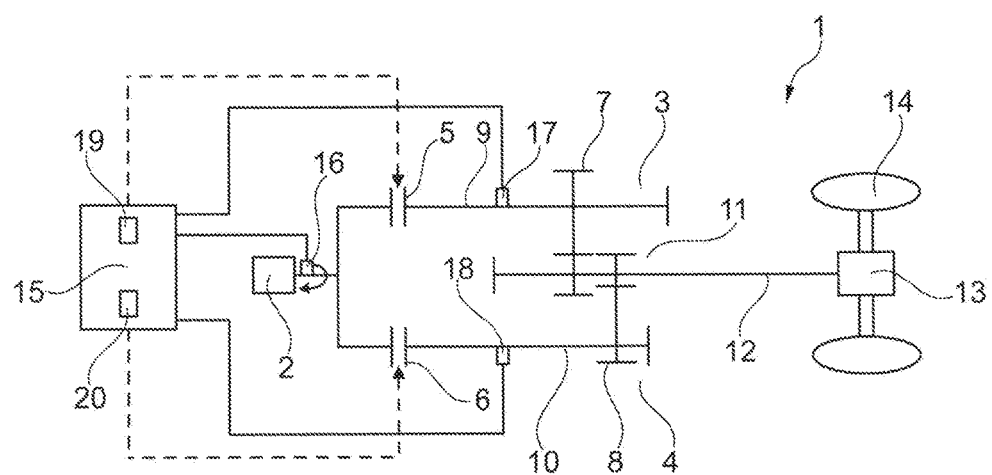

METHOD FOR CONTROLLING A POWERTRAIN

CROSS-REFERENCE TO RELATED APPLICATIONS

This application is the U.S. National Phase of PCT Appln. No. PCT/DE2016/200071 filed Feb. 4, 2016, which claims priority to DE 10 2015 203 373.2 filed Feb. 25, 2015 and DE 10 2015 208 233.4 filed May 5, 2015, the entire disclosures of which are incorporated by reference herein.

TECHNICAL FIELD

This disclosure relates to a method for controlling a powertrain, comprising an internal combustion engine which is connected to a double clutch transmission which has a first and a second partial transmission with at least one shiftable transmission stage, wherein a first friction clutch is arranged between the internal combustion engine and the first partial transmission, and a second friction clutch is arranged between the internal combustion engine and the second partial transmission, wherein an engine torque of the internal combustion engine is transmitted by the first and second friction clutches to the first or second partial transmissions in order to make available a drivetrain torque at the output of the double clutch transmission.

BACKGROUND

DE 10 2005 036 894 A1 discloses a powertrain of the generic type having a parallel transmission such as a double clutch transmission in which the engine torque of the internal combustion engine is transmitted in a controlled fashion by means of a double clutch with two friction clutches, via the two partial transmissions to a transmission output. In this context, the transmission stages are shifted and configured when the friction clutch which is assigned to a partial transmission is open. The actual shifting of the double clutch transmission takes place when the transmission stages are engaged in both partial transmissions, by means of what is referred to as an overlap shifting operation, known, for example, from WO 2007/124710 A1, in which the closed friction clutch of a torque-transmitting partial transmission is opened and the open friction clutch of the other partial transmission is closed in an overlapping fashion. In this context, the friction clutches are configured with respect to their transmission capacity in such a way that at least the maximum engine torque can be transmitted when the friction clutch is completely closed. In this context, the engine torque and the clutch torques of the friction clutches are determined or estimated continuously over the service life. If it is detected that, for example, the transmission capacity for an engine torque which is present is no longer sufficient owing to prior damage to a friction lining, the engine torque is limited to the clutch torque which can still be transmitted via the affected friction clutch. This gives rise to reductions in performance of the powertrain during operation of the partial transmission with the friction clutch which is functioning in a restricted way.

DE 11 2012 001 191 T5 discloses a method for running in clutches by means of slip control. In this method, during a green phase which corresponds to a starting phase during the activation of the clutch clutches are activated with increased slip and the clutch is activated with a normal slip in the phase following the green phase. This leads to a situation in which during the green phase the temperatures increase at the clutch, which gives rise to removal of the friction lining and therefore to renewal of the friction lining when increased slip of the clutch occurs. However, an active clutch passing through a slipping phase leads to a situation in which perceptible changes in the driving behavior of the vehicle are perceived by the vehicle occupants.

In order to reduce the fuel consumption of the vehicle further, all the friction and all the damping in the drivetrain must be reduced. The reduction of this damping or friction leads to a situation in which the drivetrain per se no longer has any more damping and therefore the clutch damping constitutes the essential factor for the occurrence of juddering oscillations.

SUMMARY

This disclosure is based on the object of specifying a method for controlling a powertrain in which juddering oscillations which are caused by the partial clutches of a double clutch transmission are reduced or entirely avoided.

According to this disclosure, the object is achieved in that the powertrain is monitored for the occurrence of juddering oscillations, and when juddering oscillations are detected a regeneration process of one of the two partial clutches is triggered, wherein a friction lining is removed in the regeneration process. As a result of this renewal of the friction lining of one of the two partial clutches during the regeneration process a contribution is made to avoiding juddering oscillations and subsequently the vehicle is in a comfortable state again. This regeneration process does not generate any changes whatsoever which can be perceived by the vehicle occupants.

The detection of the juddering oscillations is advantageously carried out by means of a judder observer which activates or deactivates the regeneration process. A judder observer is advantageous since the friction systems of the individual partial clutches differ, and the regeneration process is to be used only when the state of the partial clutches requires it.

In one refinement, the juddering oscillations are compensated by a traction control system, wherein when a judder threshold value is exceeded by an amplitude of the juddering oscillations the regeneration process of the first or second partial clutch is triggered. The judder threshold value is in this case defined in such a way that the regeneration process is started whenever the traction control system can no longer compensate the juddering oscillations which occur. By means of the judder threshold value it is easily possible to determine by means of software when the regeneration process is to be started or ended. Since the regeneration process is always carried out only on one partial clutch, the vehicle can continue to be driven with the second clutch which is not subject to the regeneration process, without further effect on the driving behavior of the vehicle.

In one variant, during the regeneration process a load profile of the double clutch transmission is varied by the inactive and/or active partial clutch. By changing the load profile it is possible to set the effect of the regeneration process in each case, wherein when the friction lining is removed both temperature and wear of the friction lining of the partial clutches are taken into account.

In one embodiment, the regeneration process is carried out on an active first partial clutch which transmits the engine torque, while the engine torque of the internal combustion engine is applied to the inactive second partial clutch which is in the slipping state, wherein the second partial clutch is moved in the direction of the closed state, and a slip control system monitors a slipping rotational speed which is applied to the second partial clutch. By setting this slipping rotational speed by means of the slip controller it is possible to configure the degree of abrasion of the friction lining of the inactive second clutch in a controlled fashion.

In one embodiment, the active first partial clutch remains closed during the regeneration process, with the result that the driving state of the vehicle remains uninfluenced.

In one alternative, the active first partial clutch is opened during the regeneration process, and the slip control system reduces a clutch torque transmitted by the first active partial clutch by the clutch torque which is transmitted by the inactive second partial clutch. As a result it is ensured that the drivetrain torque which is output by the double clutch transmission to its output is kept constant, which is significant, in particular, for a constant driving behavior.

In a further variant, when there is a low ambient temperature of the powertrain an increased slipping rotational speed is generated in the inactive second partial clutch. This has the advantage that, in particular, when juddering oscillations occur under cold and damp ambient conditions, the inactive partial clutch can be heated more quickly and therefore the duration of the regeneration process for removing friction lining is reduced.

In one embodiment, during a green phase of the respective partial clutch an increased slipping rotational speed is generated at the inactive second clutch. This leads to a situation in which during the green phase at the partial clutch the temperatures increase, which leads to removal of friction lining and therefore to renewal of the friction lining when increased slip of the partial clutch takes place.

In one refinement, in the case of low load judder wear is generated at the inactive partial clutch. This means that the surface of the inactive second clutch is removed only in the case of low judder oscillations and therefore a new lining layer of the partial clutch comes into effect.

An engine torque of approximately 10 to 25 Nm is advantageously applied to the inactive partial clutch. On the basis of such a low engine torque, the loading of the drivetrain and therefore a change in the drivetrain torque at the output of the double clutch transmission is effected only to an insignificant degree and therefore not perceived by the driver of the vehicle.

BRIEF DESCRIPTION OF THE DRAWINGS

This disclosure contemplates numerous embodiments. One of these embodiments will be explained in more detail with reference to the figures illustrated in the drawing, in which:

FIG. 1 shows a basic illustration of a powertrain with a double clutch transmission.

DETAILED DESCRIPTION

Embodiments according to this disclosure will be explained using the example of a powertrain 1 with a double clutch transmission. FIG. 1 shows a basic illustration of the powertrain 1 as is used in motor vehicles. This powertrain 1 comprises an internal combustion engine 2 and two partial transmission 3, 4. The connection of a partial transmission 3, 4 to the internal combustion engine 2 is carried out by means of one partial clutch 5, 6 in each case, which partial clutches 5, 6 are actuated by a control unit 15. The first partial transmission 3 has the uneven-numbered gear speeds 7, while the second partial transmission 4 comprises the even-numbered gear speeds 8. The gear speeds 7 and 8 are connected where necessary to a transmission input shaft 9, 10 of a transmission 11 which drives the drive wheels 14 via an output shaft 12 and a differential 13.

In such a powertrain 1 with a double clutch transmission, a gear speed 7 of the partial transmission 3 is connected to the transmission input shaft 9, while the gear speed 8 of the other partial transmission 4 is engaged. For this purpose, the behavior of the two partial clutches 5, 6 has to be set precisely in order to avoid disruption. A slipping rotational speed of the partial clutch 5 is determined by the control unit 15 by means of a rotational speed sensor 16, which detects the rotational speed of the internal combustion engine 2, and a rotational speed sensor 17, which monitors the rotational speed at the transmission input shaft 9. A further rotational speed sensor 18 is also connected to the control unit 15 and detects the rotational speed at the transmission input shaft 10 in order to determine the slipping rotational speed of the partial clutch 6. This slipping rotational speed is detected as a function of whether the partial clutches 5, 6 are closed or opened.

Owing to the friction properties of the partial clutches 5, 6, juddering oscillations occur in the rotational speed of the transmission input shaft which are monitored by the rotational speed sensors 17 and 18, the excitation frequency of which juddering oscillations may depend on the slip of the respective partial clutch 5, 6, the rotational speed of the transmission input shaft or the engine rotational speed. The juddering oscillations are detected by a judder observer 19 which is present in the control unit 15. The amplitudes of the juddering oscillations are evaluated by means of a juddering oscillation control system and compared with a juddering oscillation threshold value. If the judder observer detects that the juddering oscillations which occur can no longer be compensated by the juddering oscillation control system, the control unit 15 starts a regeneration process for the inactive partial clutch 6 of the double clutch transmission during the operation of the vehicle. During this regeneration process, approximately the entire engine torque of the internal combustion engine 2 is applied to the first active partial clutch 5. A drivetrain torque for driving the drive wheels 14 is therefore taken off at the transmission output shaft 12, which corresponds to the engine torque of the internal combustion engine 2. During this state of the first partial clutch 5 the second partial clutch 6 is in the slipping state and is therefore inactive. In order to generate abrasion of the friction lining at the inactive partial clutch 6, an engine torque of approximately 20 Nm is applied to this partial clutch 6, and the partial clutch 6 is moved in the direction of closing, with the result that the slipping rotational speed is set at this partial clutch 6. Depending on the magnitude of the slip, abrasion of the friction lining of the inactive partial clutch 6 takes place as a result of wear. A relatively long setting of the slip can, however, also give rise to an increase in temperature of the inactive partial clutch 6, which entails increased abrasion of the friction lining of the partial clutch 6. In order to maintain the stability of the double clutch transmission and to keep constant the drivetrain torque which is taken off at the transmission output shaft 12, a slip control system 20 which is present in the control unit 15 subtracts the engine torque of 20 Nm, which is present at the inactive partial clutch 6, from the engine torque which is transmitted to the active partial clutch 5 by the internal combustion engine 2.

By virtue of the proposed solution, the load profile of the powertrain is changed selectively by setting the active and inactive partial clutches 5, 6 in order to therefore move through critical situations such as juddering oscillations more quickly or even to avoid them entirely.

LIST OF REFERENCE NUMBERS

1 Powertrain
2 Internal combustion engine
3 First partial transmission
4 Second partial transmission
5 First partial clutch
6 Second partial clutch
7 Uneven-numbered gear speed
8 Even-numbered gear speed
9 Transmission input shaft
10 Transmission input shaft
11 Transmission
12 Transmission output shaft
13 Differential
14 Drive wheels
15 Control unit
16 Rotational speed sensor
17 Rotational speed sensor
18 Rotational speed sensor
19 Judder observer
20 Slip control system

The invention claimed is:

1. A method for controlling a powertrain, comprising an internal combustion engine connected to a double clutch transmission having a first and a second partial transmission with at least one shiftable transmission stage, wherein a first friction clutch is arranged between the internal combustion engine and the first partial transmission, and a second friction clutch is arranged between the internal combustion engine and the second partial transmission, the method comprising:
transmitting an engine torque of the internal combustion engine by the first or second friction clutches to the first or second partial transmissions to provide a drivetrain torque at an output of the double clutch transmission; and
monitoring the powertrain for an occurrence of juddering oscillations, wherein in response to juddering oscillations being detected a regeneration process of one of the first and second friction clutches is triggered, wherein a friction lining is removed in the regeneration process, and wherein in response to low ambient temperature of the powertrain, an increased slipping rotational speed is generated at the second friction clutch during the regeneration process.

2. The method of claim 1, wherein monitoring the powertrain for the occurrence of the juddering oscillations is carried out by a judder observer, the judder observer activating or deactivating the regeneration process.

3. The method of claim 1, wherein the juddering oscillations are compensated by a traction control system, wherein in response to a judder threshold value being exceeded by an amplitude of the juddering oscillations, the regeneration process of the first or second friction clutch is triggered.

4. The method of claim 1, wherein during the regeneration process a load profile of the powertrain is varied by the first or second friction clutch.

5. The method of claim 4, wherein, during the regeneration process, the first friction clutch being in an active state to transmit the engine torque, while the engine torque of the internal combustion engine is applied to the second friction clutch, the second friction clutch being in an inactive state and being in a slipping state, wherein the second friction clutch is moved in a direction of a closed state, and a slip control system monitors a slipping rotational speed applied to the second friction clutch.

6. The method of claim 5, wherein the first friction clutch remains closed during the regeneration process.

7. The method of claim 5, wherein the slip control system reduces a clutch torque transmitted by the first friction clutch by the clutch torque that is transmitted by the second friction clutch.

8. The method of claim 1, wherein in response to low load judder being detected, the regeneration process is triggered at the second friction clutch.

9. The method of claim 1, wherein an engine torque of approximately 10 to 25 Nm is applied to the second friction clutch.

10. A method of controlling a powertrain comprising:
providing a powertrain comprising:
an internal combustion engine arranged to transmit an engine torque;
a double clutch transmission comprising:
an output;
a first partial transmission with a first shiftable transmission stage; and,
a second partial transmission with a second shiftable transmission stage;
a first friction clutch arranged between the internal combustion engine and the first partial transmission;
a second friction clutch, comprising a friction lining, arranged between the internal combustion engine and the second partial transmission; and
a slip control system;
transmitting the engine torque by the second friction clutch to the second partial transmission to output a drivetrain torque at the output of the double clutch transmission;
monitoring the powertrain for a juddering oscillation of the second friction clutch;
detecting the juddering oscillation;
in response to the detection of juddering oscillation, closing the first friction clutch and opening the second friction clutch in an overlapping fashion;
triggering a regeneration process of the second friction clutch to generate abrasion of the friction lining; and
during the regeneration process;
a load profile of the powertrain is varied by the first friction clutch or the second friction clutch;
the second friction clutch is moved from a slipping state towards a closed state;
a portion of the engine torque is applied to the second friction clutch; and
the slip control system monitors a slipping rotational speed of the second friction clutch.

11. The method of claim 10 wherein:
the powertrain comprises a judder observer;
the judder observer is arranged to detect the juddering oscillation; and,
the judder observer activates or deactivates the regeneration process.

12. The method of claim 10 wherein:
the powertrain comprises a traction control system;
the juddering oscillation is compensated by the traction control system; and,
the regeneration process is triggered when an amplitude of the juddering oscillation exceeds a judder threshold value.

13. The method of claim 10 wherein the first friction clutch remains closed during the regeneration process.

14. The method of claim 10 wherein the slip control system reduces a first torque transmitted by the first friction clutch by an amount equal to a second torque transmitted by the second friction clutch during the regeneration process.

15. The method of claim 10 wherein the slipping rotational speed of the second friction clutch is increased during the regeneration process when an ambient temperature of the powertrain is below a threshold value.

16. The method of claim 10 wherein the regeneration process is triggered when a low load judder is detected.

17. The method of claim 10 wherein approximately 10 Nm to 25 Nm of the engine torque is transmitted by the second friction clutch during the regeneration process.

* * * * *